D. HALL.
DYNAMO ELECTRIC MACHINE.
APPLICATION FILED JAN. 31, 1906.
916,928.
Patented Mar. 30, 1909.
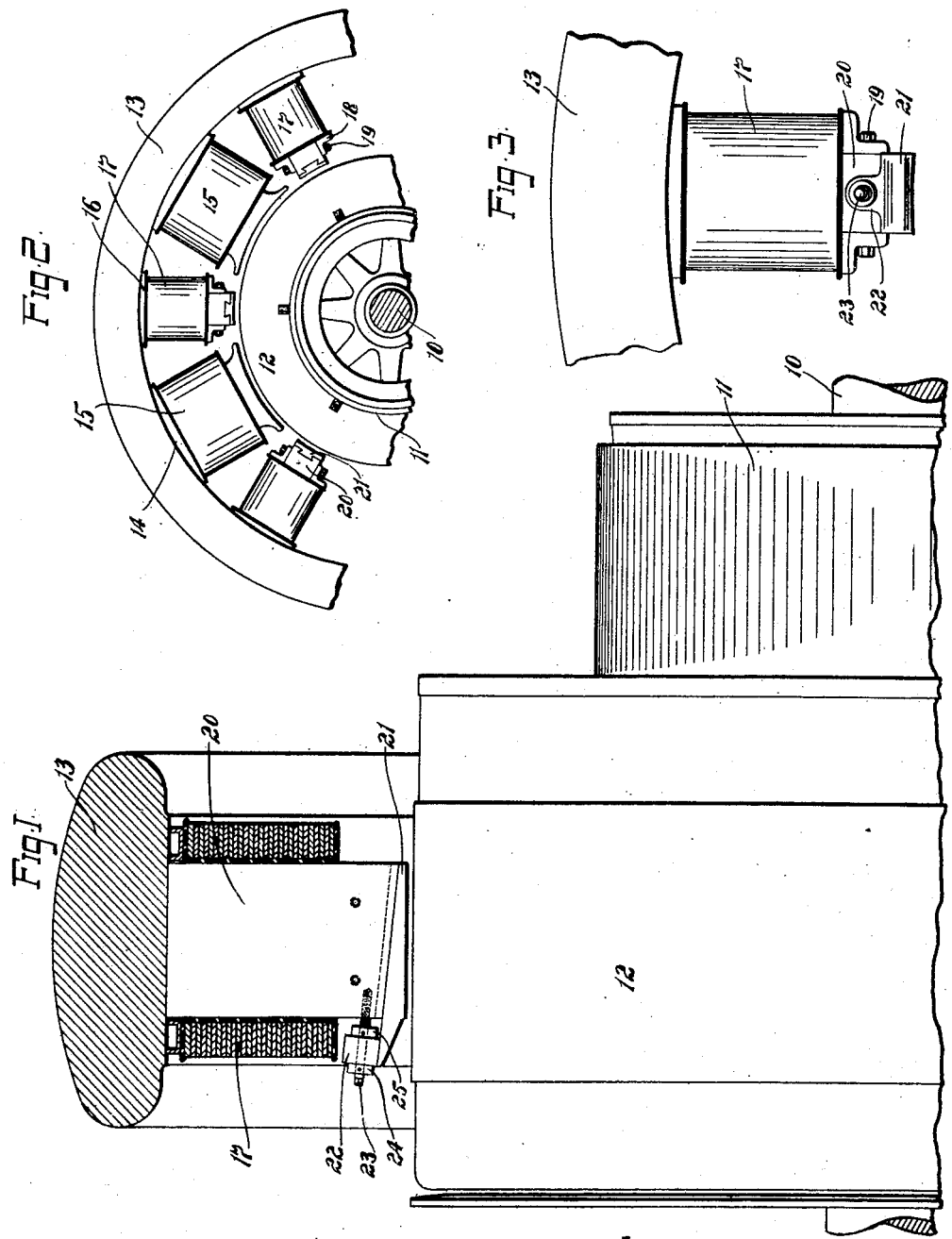
WITNESSES:
George J. Schwartz
Fred J. Kinsey
INVENTOR:
David Hall
By
Chas. E. Lord
ATTORNEY

UNITED STATES PATENT OFFICE.

DAVID HALL, OF NORWOOD, OHIO, ASSIGNOR TO THE BULLOCK ELECTRIC MANUFACTURING COMPANY, A CORPORATION OF OHIO.

DYNAMO-ELECTRIC MACHINE.

No. 916,928.      Specification of Letters Patent.      Patented March 30, 1909.

Application filed January 31, 1906. Serial No. 298,752.

*To all whom it may concern:*

Be it known that I, DAVID HALL, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines of the type having auxiliary or commutating field poles intermediate the main field poles for reducing sparking at the brushes.

It is sometimes a difficult matter to so design the machines that the commutating fields are of just a proper intensity to reduce sparking at the brushes to a minimum. This is especially true of large machines designed for heavy currents. As the auxiliary field windings are usually in series with the armature, and carry the entire armature current, it is seen that a very slight error in the number of turns has considerable effect on the ampere-turns of the poles. Furthermore, on account of the inequalities in the material employed and for other causes the reluctance of the magnetic circuit through one pair of auxiliary poles may be different from the reluctances of the circuits through the other pairs of poles, which condition results in unsatisfactory commutation.

The object of my invention is to provide means whereby the intensity of the commutating fields can be adjusted so that the sparking at each brush can be eliminated or reduced to a minimum. With this end in view I provide auxiliary field poles the inner end-portions of which can be adjusted, whereby the air gap and reluctances of the magnetic circuits can be changed.

More specifically considered my invention consists in a dynamo-electric machine having main field poles, and auxiliary field poles intermediate the main field poles, each auxiliary field pole comprising a normally fixed main portion and an adjustable inner end portion, the two parts being dove-tailed together and their adjacent surfaces being inclined to the axis of the machine, whereby the effective lengths of the auxiliary field poles can be adjusted.

My invention still further consists in the details of construction and combinations of parts described in the specification and set forth in the appended claims.

For a better understanding of my invention, reference is had to the accompanying drawing in which—

Figure 1 is a partial sectional elevation of a dynamo-electric machine having my invention applied thereto; Fig. 2 is a partial end elevation of the commutator end of the machine, the shaft being shown in section; and Fig. 3 is an elevation of a portion of the field frame and one of the auxiliary field poles, the view being taken from the opposite end of the machine.

Referring now to the figures of the drawing, I have shown at 10 the shaft of the machine on which are mounted the commutator 11 and the armature 12. Surrounding the armature is the field frame 13 having inwardly extending main field poles 14 which carry main field coils 15. Intermediate the main field poles are the auxiliary field poles 16, provided with auxiliary field coils 17. The object of these coils and poles which are supported opposite the brushes is, as is well known, to provide commutating fields for the armature coils short-circuited by the brushes, in order to reduce sparking at the brushes. The auxiliary field coils in this case consist of edgewise wound strap copper, the field coils being held in place by supports 18 secured to the field poles by bolts 19.

Each auxiliary field pole, as is shown most clearly in Fig. 1, comprises a normally fixed main portion 20 and a movable portion 21 at the inner or armature end of the pole. The two portions of each pole are held together in this case by a dove-tailed joint, and adjacent surfaces of the parts are inclined to the axis of the machine so that when the end portion is moved in the direction of the axis of the machine it will also be moved in a radial direction to vary the effective length of the pole. As is shown in Figs. 1 and 3, each adjustable end portion 21 is provided at one side with an extension or neck portion 22. This extension is provided with a hole or opening and the corresponding fixed portion of the pole is provided with a tapped opening, the two openings being in line with each other and arranged parallel to the adjacent surfaces of the two parts. A screw or bolt 23 has a threaded portion engaging the tapped hole in the fixed portion of the pole and an unthreaded portion engaging the extension 22. Collars 24 and 25 fixed to the bolt at each side of the neck or extension 22 prevent longitudinal movement of the bolt relative to said neck portion. The outer end of the bolt is preferably provided with a squared end portion by means of which the bolt can be turned. It is seen that by adjusting the bolts 23 the movable end portion 21 of each auxiliary field pole can be adjusted, being moved both longitudinally and axially of the armature. Thus the effective length and hence the effective air gap of each auxiliary field-pole can be separately adjusted and therefore the reluctance and the intensity of each auxiliary magnetic field circuit can be increased or descreased by adjusting the position of the inner ends of the poles.

I do not wish to be confined to the exact details shown, as many modifications can be made without departing from the spirit and scope of my invention.

What I claim as new and desire to secure by Letters Patent is:—

1. In a dynamo-electric machine, main and auxiliary field poles having field coils, the inner portion of each of said auxiliary poles being adjustable in its entirety and independently of the rest of the pole whereby the effective length of said pole can be changed.

2. In a dynamo-electric machine, main field poles, field coils thereon, auxiliary field poles intermediate the main field poles, auxiliary field coils or commutating coils on said last named field poles, and means for adjusting the entire inner ends of the auxiliary field poles independently of the bodies of said poles to change the effective lengths of said poles.

3. In a dynamo-electric machine, an armature, field poles having field coils, and auxiliary field poles having commutating coils, each auxiliary pole comprising two parts, the entire inner parts of the auxiliary field poles being adjustable toward and away from the armature to change the reluctance of the auxiliary field magnetic circuits.

4. In a dynamo-electric machine, an armature, main field poles having field coils, and auxiliary field poles intermediate the main field poles and having commutating coils, each auxiliary pole comprising two relatively movable parts, the entire inner ends of the auxiliary poles being adjustable axially to vary the reluctance of the commutating field magnetic circuits.

5. In a dynamo-electric machine, an armature, main field poles having field coils, auxiliary field poles intermediate the main field poles, commutating field coils thereon, and means whereby the inner ends of said auxiliary field poles can be adjusted independently of the main portions thereof toward and away from the armature, and longitudinally thereof.

6. In a dynamo-electric machine, an armature, main field poles having field coils, and auxiliary field poles having commutating coils, each auxiliary pole comprising a fixed part and a movable part, the adjacent surfaces of which engage and are inclined to the axis of the armature.

7. In a dynamo-electric machine, an armature, main field poles having field coils, auxiliary field poles having commutating coils, and means whereby the inner or armature end of each auxiliary field pole can be adjusted independently of the remainder thereof in a radial and an axial direction to vary the commutating field magnetic circuits.

8. In a dynamo-electric machine, an armature, main field poles having main field coils, and auxiliary field poles provided with commutating field coils, each auxiliary field pole comprising two relatively movable parts obliquely dove-tailed together.

9. In a dynamo-electric machine, an armature, main field poles having main field coils, and auxiliary field poles having auxiliary or commutating field coils, each auxiliary pole comprising two relatively movable parts dove-tailed together, and means for adjusting and holding in fixed positions the inner ends of said pole pieces.

10. In a dynamo-electric machine, an armature, main field poles having field coils, and auxiliary field poles having commutating field coils, each auxiliary pole comprising a normally fixed main portion and an adjustable inner end portion, the two parts of each pole being dove-tailed together, and the adjacent surfaces of the two parts being inclined to the axis of the machine.

11. In a dynamo-electric machine, an armature, main field poles having field coils, auxiliary field poles having commutating field coils, each auxiliary field pole consisting of a normally fixed main portion and an adjustable inner end-portion, the two parts being dove-tailed together and the dove-tailed portions being inclined to the axis of the armature, and means for adjusting and holding in fixed positions the movable portion of each auxiliary pole.

12. In a dynamo-electric machine, an armature, main field poles having field coils, auxiliary field poles having auxiliary or commutating field coils, each auxiliary field pole comprising a main portion and an inner end portion adjustable only in its entirety, and means engaging the main portion and the inner end portion of each pole for adjusting and holding the movable portions in fixed positions.

13. In a dynamo-electric machine, an armature, and a field frame having main field poles and auxiliary field poles, each auxiliary field pole comprising a relatively fixed portion and a movable end portion, the latter having at one side an extension or neck and a screw or bolt engaging the extension and the fixed portion for adjusting the position of the movable portion.

14. In a dynamo-electric machine, a field pole comprising a fixed main portion, and a movable inner end portion arranged to be moved in a direction oblique both to the axis of said pole and to the axis of rotation of the machine.

15. In a dynamo-electric machine, an armature, and a field pole comprising a fixed main portion and an end portion, the latter portion being adjustable in its entirety to vary the air gap between the field pole and the armature.

In testimony whereof I affix my signature in the presence of two witnesses.

DAVID HALL.

Witnesses:
ARTHUR F. KWIS,
FRED J. KINSEY.